United States Patent
Paquet et al.

(10) Patent No.: US 9,533,230 B2
(45) Date of Patent: Jan. 3, 2017

(54) GHOST EXPRESSIONS BASED ON GHOST DATA AUGMENTED BY USER-PROVIDED INFORMATION

(75) Inventors: Philippe Paquet, Studio City, CA (US); Amy Kalson, Burbank, CA (US); Mark Stuart, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 213 days.

(21) Appl. No.: 13/108,297

(22) Filed: May 16, 2011

(65) Prior Publication Data
US 2012/0295718 A1    Nov. 22, 2012

(51) Int. Cl.
| | | |
|---|---|---|
| A63F 13/5375 | (2014.01) | |
| A63F 13/86 | (2014.01) | |
| A63F 13/79 | (2014.01) | |
| H04L 29/06 | (2006.01) | |

(52) U.S. Cl.
CPC ........... *A63F 13/86* (2014.09); *A63F 13/5375* (2014.09); *A63F 13/79* (2014.09); *A63F 2300/5533* (2013.01); *A63F 2300/577* (2013.01); *A63F 2300/646* (2013.01); *H04L 67/38* (2013.01)

(58) Field of Classification Search
CPC .. A63F 13/497; A63F 13/86; A63F 2300/577; A63F 2300/634; A63F 13/537; A63F 13/5375; A63F 2300/305
USPC .......................................................... 463/43
See application file for complete search history.

(56) References Cited

U.S. PATENT DOCUMENTS

| | | |
|---|---|---|
| 5,987,420 A | 11/1999 | Maeda |
| 6,813,608 B1 | 11/2004 | Baranowski |
| 7,380,150 B2 | 5/2008 | Meier |
| 7,400,253 B2 | 7/2008 | Cohen |
| 7,400,932 B2 | 7/2008 | Ackley |
| 7,424,265 B2 | 9/2008 | Umeda |
| 7,787,965 B2 | 8/2010 | Hale |
| 7,791,481 B2 | 9/2010 | Landt |
| 7,856,360 B2 | 12/2010 | Kramer |
| 8,068,600 B2 | 11/2011 | Collins |
| 8,082,165 B2 | 12/2011 | Natsuyama |

(Continued)

OTHER PUBLICATIONS

Cardiff, Michael, et al., 'Maximizing Fun at a Theme Park: The M'TP', 2000, Oberlin.edu, pp. 1-16.

(Continued)

*Primary Examiner* — Damon Pierce
(74) *Attorney, Agent, or Firm* — Sheppard Mullin Richter & Hampton LLP

(57) ABSTRACT

Ghost expressions with user-provided information may be provided in asynchronous gameplay. According to some implementations, ghost data associated with a first performance by a first user of a first task in a game may be obtained. The ghost data may be configured to allow generation of a ghost expression in the game corresponding to the first performance of the first task in the game by the first user. User-provided information associated with the first performance of the first task in the game may be obtained. The ghost data may be augmented with the user-provided information to obtain augmented ghost data. The augmented ghost data may be provided to effectuate presentation in the game of the ghost expression and at least some of the user-provided information via a client computing platform associated with the first user or a second user of the game.

16 Claims, 2 Drawing Sheets

(56) References Cited

U.S. PATENT DOCUMENTS

| | | | |
|---|---|---|---|
| 8,200,515 B2 | 6/2012 | Natsuyama | |
| 8,253,542 B2 | 8/2012 | Canora | |
| 8,287,341 B1* | 10/2012 | Reynolds et al. | 463/9 |
| 8,325,015 B2 | 12/2012 | Hall | |
| 8,400,278 B2 | 3/2013 | Koyama | |
| 8,552,597 B2 | 10/2013 | Song | |
| 8,775,244 B2 | 7/2014 | Boss | |
| 8,797,146 B2 | 8/2014 | Cook | |
| 2002/0077872 A1 | 6/2002 | Lancos | |
| 2002/0116235 A1 | 8/2002 | Grimm | |
| 2003/0054869 A1* | 3/2003 | Hightower | 463/6 |
| 2004/0100390 A1 | 5/2004 | Giraldin | |
| 2004/0117219 A1 | 6/2004 | Sugimoto | |
| 2004/0224741 A1* | 11/2004 | Jen et al. | 463/6 |
| 2004/0225540 A1 | 11/2004 | Waytena | |
| 2006/0281435 A1 | 12/2006 | Shearer | |
| 2006/0287106 A1* | 12/2006 | Jensen | 463/42 |
| 2007/0108297 A1 | 5/2007 | Bates | |
| 2007/0117635 A1* | 5/2007 | Spanton et al. | 463/43 |
| 2007/0203763 A1 | 8/2007 | Ackley | |
| 2008/0055279 A1 | 3/2008 | Osada | |
| 2008/0211630 A1 | 9/2008 | Butler | |
| 2009/0117872 A1 | 5/2009 | Jorgenson | |
| 2009/0131177 A1* | 5/2009 | Pearce | A63F 13/10 463/43 |
| 2009/0172035 A1 | 7/2009 | Lessing | |
| 2009/0174361 A1 | 7/2009 | Duron | |
| 2009/0216633 A1 | 8/2009 | Whitsett | |
| 2009/0218891 A1 | 9/2009 | McCollough | |
| 2009/0299807 A1 | 12/2009 | Schiller | |
| 2011/0181399 A1 | 7/2011 | Pollack | |
| 2012/0094765 A1* | 4/2012 | Reynolds et al. | 463/42 |
| 2013/0018661 A1 | 1/2013 | Padgett | |
| 2013/0018684 A1 | 1/2013 | Padgett | |
| 2013/0249301 A1 | 9/2013 | Smoot | |

OTHER PUBLICATIONS

Guo, Qiang, et al., 'Optimization Model and Simulation of the Queuing System with Quickpass', Proceedings of the 6th World Congress on Intelligent Control and Automation, Jun. 21-23, 2006, 4 pages.

Matsuo, Yutaka, et al. "Story-Based Planning in Theme Park", MAMUS 2003, LNAI 3012, Springer-Verlag, 2004, pp. 70-85.

Mielke, Roland, et al., 'Simulation Applied to Theme Park Management', Proceedings of the 1998 Winter Simulation Conference, 1998, ieeexplore.ieee.org, pp. 1199-1203.

Pullman, Madeleine, et al., 'Capacity Management for Hospitality and Tourism: A Review of Current Approaches', International Journal of Hospitality Management, vol. 29, 2010, pp. 177-187.

Kurato, "Interactive Assistance for Tour Planning", Spatial Cognition VII, LNAI 6222, pp. 289-302, (2010).

Souffriau, "Tourist Trip Planning Functionalities: State-of-the-Art and Future", 12 pgs., (2010) Springer.

Multi Motions, "Ride Reservation System," printed form the Internet on Jul. 11, 2011 <http://multimotions.websystems.nl/eng/prod_riders.html> (1 page).

* cited by examiner

GHOST EXPRESSIONS BASED ON GHOST DATA AUGMENTED BY USER-PROVIDED INFORMATION

FIELD OF THE INVENTION

The invention relates to enabling user-augmentation of ghost data for asynchronously played games.

BACKGROUND

In some games, multiple players can play asynchronously over a network. This can be accomplished, in part, through the use of ghost data. For example, a first player may perform a race in a racing game. Ghost data may be generated and stored corresponding to the user's performance. During a subsequent performance of the race by the first player or another player, a ghost expression may be generated based on the ghost data. In some games, the ghost expression may be an image or "ghost" representing the first player's initial performance of the race. As such, the first player or another player can "compete" against the first player's initial performance of the race. One drawback of the existing technology is that such gameplay is impersonal and fails to provide a sense of playing against (or with) another player.

SUMMARY

One aspect of the invention relates to a system and method for providing ghost expressions with user-provided information in asynchronous gameplay. Ghost data obtained in connection with a first user's performance of a first task in a game may be augmented by information provided by the first user and/or other users of the game. Examples of the user-provided information may include metadata, text, images, audio, video, olfactory feedback, haptic feedback, and/or other user-provided information. Ghost expressions based on the augmented ghost data and presented in a second performance of the first task may include a visualization of the first performance by the first user as well as some or all of the user-provided information. Such ghost expressions based on the augmented ghost data enhance the user experience during the second performance as compared with prior approaches to asynchronously played games. It will be appreciated that, while the present invention is described in context with games, this is not intended to be limiting as the concepts and features disclosed herein may be applied to virtual worlds and/or other virtual environments.

The system may include a game server. The game server may be configured to communicate with one or more client computing platforms via any one of a number of communication channels. The game server may be configured to execute one or more computer program modules. The computer program modules may include one or more of a user module, a game module, a relationship module, a ghost data module, a user-provided information module, an augmentation module, a rules module, and/or other modules.

The user module may be configured to access and/or manage one or more user profiles associated with users of the system. The user profiles may include, for example, information identifying users within the game, game account information, game usage information, and/or other information related to users. The one or more user profiles may include information stored by the game server, one or more of the client computing platforms, and/or other storage locations.

The game module may be configured to implement an instance of a game and determine views of the game. The views may then be communicated from game server to client computing platforms for presentation to users. A view determined and transmitted to a given client computing platform may correspond to a user character being controlled by a user via the given client computing platform.

The relationship module may be configured to establish relationships between users within the game. Such relationships may include one or more of friendships, guilds (with guild-mates), alliances, connections, followers, groups, and/or other relationships. The relationship module may establish relationships based on relationship requests and acceptances received from users.

The ghost data module may be configured to obtain ghost data associated with a first performance by a first user of a first task in a game. A task may include, for example, a race, a mission, a fight, an episode, a competition, a session, a quest, a level, and/or other stages and/or activities within the game. The ghost data may be utilized to generate a ghost expression during subsequent performances of the first task in the game. In some implementations, the ghost expression may resemble a user character associated with the first performance of the first task where the ghost expression follows the same path and/or performs the same actions as in the first performance during a subsequent performance of the first task.

The user-provided information module may be configured to obtain user-provided information associated with the first performance of the first task in the game. The user-provided information may include one or more of metadata, text, an image, audio, video, olfactory feedback, haptic feedback, and/or other informational and/or sensory feedback. The user-provided information may be provided by the first user during the first performance of the task and/or after the first performance. The user-provided information may be provided by other users via corresponding client computing platforms.

The augmentation module may be configured to obtain augmented ghost data. The augmented ghost data may be generated by augmenting the ghost data with the user-provided information. In some implementations, the augmentation module may be configured to associate one or more portions of the user-provided information with one or more portions of the ghost data. For example, some portions of the user-provided information may correspond to certain temporal points of the first task, progress points of the first task, and/or spatial points within the game.

Referring again to the game module, it may be configured to provide the augmented ghost data to effectuate presentation in the game of the ghost expression and at least some of the user-provided information via one or more of the client computing platforms. That is, during a subsequent performance of the first task—either by the first user or another user—at least some of the user-provided information may be presented along with the ghost expression.

The rules module may be configured to determine the presentation of the at least some of the user-provided information during a subsequent performance of the first task based on one or more rules. Rules for presentation of the user-provided information may be based on one or more of an individual user identity, information derived from a user profile, a group of users, a parental control metric, demographic data, a status associated with one or more users, one or more relationships associated with the first user, and/or other information.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
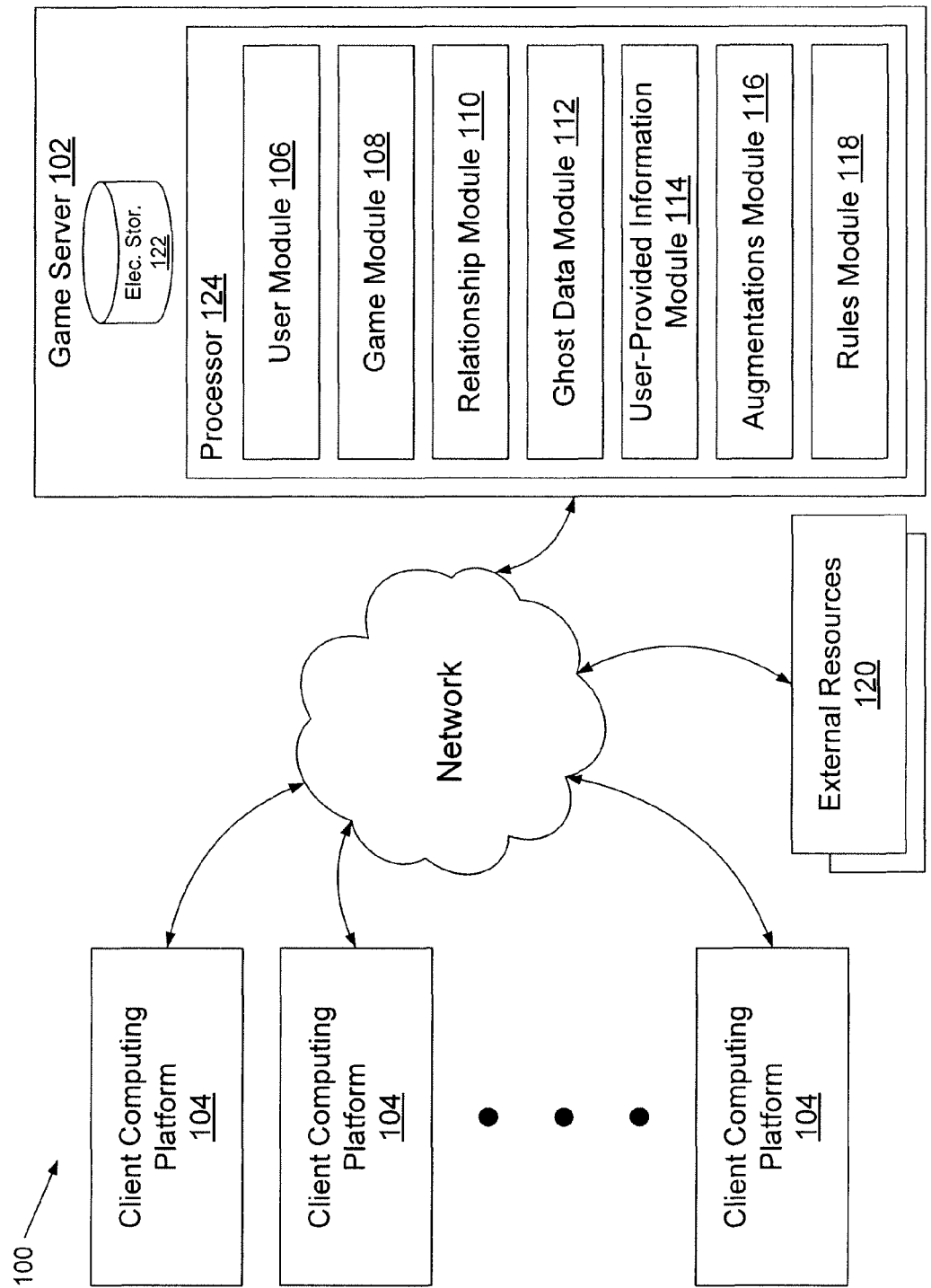
FIG. 1 illustrates a system configured for providing ghost expressions with user-provided information in asynchronous gameplay, in accordance with one or more implementations.

FIG. 1 illustrates a system 100 configured for providing ghost expressions with user-provided information in asynchronous gameplay, in accordance with one or more implementations. Examples of such a game may include a video game, a social game, and/or other games. It will be appreciated that, while the present invention is described herein in context with games, this is not intended to be limiting as the concepts and features may be applied to a virtual world, a virtual space, and/or other virtual environments. In some implementations, system 100 may include a game server 102. The game server 102 may be configured to communicate with one or more client computing platforms 104 according to a client/server architecture. Users may access system 100 and/or the game via client computing platforms 104.

The game server 102 may be configured to execute one or more computer program modules. The computer program modules may include one or more of a user module 106, a game module 108, a relationship module 110, a ghost data module 112, a user-provided information module 114, an augmentation module 116, a rules module 118, and/or other modules.

The user module 106 may be configured to access and/or manage one or more user profiles associated with users of the system 100. The one or more user profiles may include information stored by game server 102, one or more of the client computing platforms 104, and/or other storage locations. The user profiles may include, for example, information identifying users (e.g., a username or handle, a number, an identifier, and/or other identifying information) within the game, security login information (e.g., a login code or password), game account information, subscription information, virtual currency account information (e.g., related to currency held in credit for a user), relationship information (e.g., information related to relationships between users in the game), game usage information, demographic information associated with users, interaction history among users in the game, information stated by users, purchase information of users, browsing history of users, a client computing platform identification associated with a user, a phone number associated with a user, and/or other information related to users.

The game module 108 may be configured to implement an instance of a game and determine views of the game. The views may then be communicated (e.g., via streaming, via object/position data, and/or other information) from game server 102 to client computing platforms 104 for presentation to users. The view determined and transmitted to a given client computing platform 104 may correspond to a user character being controlled by a user via the given client computing platform 104. The view determined and transmitted to a given client computing platform 104 may correspond to a location in the game (e.g., the location from which the view is taken, the location the view depicts, and/or other locations), a zoom ratio, a dimensionality of objects, a point-of-view, and/or view parameters. One or more of the view parameters may be selectable by the user.

The instance of the game may comprise a simulated space that is accessible by users via client computing platforms 104, which present the views of the game to the users. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the simulated space, and/or surface features of a surface or objects that are "native" to the simulated space. In some instances, the topography may describe a surface (e.g., a ground surface) that runs through at least a substantial portion of the simulated space. In some instances, the topography may describe a volume with one or more bodies positioned therein (e.g., a simulation of gravity-deprived space with one or more celestial bodies positioned therein). The instance of the game may be synchronous, asynchronous, and/or semi-synchronous.

The above description of the manner in which views of the game are determined by game module 108 is not intended to be limiting. The game module 108 may be configured to express the game in a more limited, or richer, manner. For example, views determined for the game may be selected from a limited set of graphics depicting an event in a given place within the game. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the game are contemplated.

Within the instance(s) of the game executed by game module 108, users may control characters, objects, simulated physical phenomena (e.g., wind, rain, earthquakes, and/or other phenomena), and/or other elements within the game to interact with the game and/or each other. The user characters may include avatars. As used herein, the term "user character" may refer to an object (or group of objects) present in the game that represents an individual user. The user character may be controlled by the user with which it is associated. The user controlled element(s) may move through and interact with the game (e.g., non-user characters in the game and/or other objects in the game). The user controlled elements controlled by and/or associated with a given user may be created and/or customized by the given user. The user may have an "inventory" of virtual goods and/or virtual currency that the user can use (e.g., by manipulation of a user character or other user controlled element, and/or other items) within the game.

The users may participate in the instance of the game by controlling one or more of the available user controlled elements in the game. Control may be exercised through control inputs and/or command inputs by the users through client computing platforms 104. The users may interact with each other through communications exchanged within the game. Such communications may include one or more of textual chat, instant messages, private messages, voice communications, and/or other communications. Communications may be received and entered by the users via their respective client computing platforms 104. Communications may be routed to and from the appropriate users through game server 102 (e.g., through game module 108).

The relationship module 110 may be configured to establish relationships between users within the game. Such relationships may include one or more of friendships, guilds (with guild-mates), alliances, connections, followers, groups, and/or other relationships. The relationship module 110 may establish relationships based on relationship requests and acceptances received from users. Establishment of a relationship may be initiated by a single communication (e.g., a request) initiated by a given user requesting a relationship between the given user and one or more other users. Establishment of a relationship may require a first communication from the given user to be approved by the one or more other users. Relationships may include one or more types of relationships that have a functional purpose or impact within the game, and/or one or more types of relationships that a social construct within the game that does not have a functional result.

The ghost data module 112 may be configured to obtain ghost data associated with a first performance by a first user of a first task in a game. The ghost data may be configured to allow generation of a ghost expression in the game corresponding to the first performance of the first task in the game by the first user. The task may include a race, a mission, a fight, an episode, a competition, a session, a quest, a level, and/or other stages and/or activities within the game.

In some implementations, the ghost data may include object/position data of a user character during the first performance of the first task. The object/position data may be determined by various components of system 100. For example, the object/position data may be determined at a given client computing platform 104 and transmitted to game server 102. In accordance with some implementations, the ghost data module 112 may be configured to determine the object/position data.

The ghost data (e.g., object/position data) may be utilized to generate a ghost expression during subsequent performances of the first task in the game. In some implementations, the ghost expression may resemble the user character associated with the first performance of the first task where the ghost expression follows the same path and/or performs the same actions as in the first performance during a subsequent performance of the first task.

The user-provided information module 114 may be configured to obtain user-provided information associated with the first performance of the first task in the game. The user-provided information may include one or more of metadata, text, an image, audio, video, olfactory feedback, haptic feedback, and/or other informational and/or sensory feedback.

The user-provided information may be provided by the first user during the first performance of the task and/or after the first performance. The first user may provide the user-provided information to the ghost expression information via one or more suitable user interfaces of a given client computing platform 104. By way of non-limiting example, during the first performance of the task, the first user may enter text into a textbox such that the text, when entered, will correspond to the present temporal point of the task, the present progress point of the task, and/or the present spatial point of within the game. The user-provided information may be provided by other users via corresponding client computing platforms 104. For example, another user may enter text into a textbox during a subsequent performance of the task. In some implementations, metadata may be generated by an input device (e.g., a gamepad).

The augmentation module 116 may be configured to obtain augmented ghost data. The augmented ghost data may be generated by augmenting the ghost data with the user-provided information. In some implementations, the augmentation module 116 may be configured to associate one or more portions of the user-provided information with one or more portions of the ghost data. To illustrate, by way of non-limiting example, augmented ghost data may include textual or audio commentary provided by the first user during performance of a first task such that the commentary is presented during a subsequent performance of the first task at the same point(s) in the first task at which it was provided by the first user.

Referring again to the game module 108, it may be configured to provide the augmented ghost data to effectuate presentation in the game of the ghost expression and/or at least some of the user-provided information via one or more of the client computing platforms 104. That is, during a subsequent performance of the first task—either by the first user or another user—at least some of the user-provided information may be presented along with the ghost expression or without the ghost expression. This may give a more interactive feel in that the first player can taunt subsequent players, give subsequent players informational support or advice, provide their reactions to game situations being experienced by subsequent players, and/or effectuate other interactions typical to synchronous gameplay.

According to some implementations, some portions of the user-provided information may correspond to certain temporal points of the first task, progress points of the first task, and/or spatial points within the game. By way of non-limiting example, if the first task was a race in a car racing game, there may be user-provided information associated with a particularly difficult turn on the racetrack such that during a subsequent performance of the race, text and/or audio (or other user-provided information) may be presented when the difficult turn is encountered. According to some implementations, presentation of some or all of the user-provided information may be filtered based on one or more rules, as discussed below in connection with the rules module 118.

The rules module 118 may be configured to determine the presentation of the at least some of the user-provided information during a subsequent performance of the first task based on one or more rules. Rules for presentation of the user-provided information may be based on one or more of an individual user identity, information derived from a user profile, a group of users, a parental control metric, demographic data, a status associated with one or more users, one or more relationships associated with the first user, an expiration date and/or time associated with the user-augmented information, metrics associated with individual ones of the client computing platforms 104, and/or other information. Individual ones of the rules may be determined automatically by client computing platforms 104 and/or game server 102, and/or may be established by users via the client computing platforms 104.

In some implementations, game server 102, client computing platforms 104, and/or external resources 120 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which game server 102, client computing platforms 104, and/or external resources 120 may be operatively linked via some other communication media.

A given client computing platform 104 may include one or more processors configured to execute computer program modules. The computer program modules may be configured to enable an expert or user associated with the given client computing platform 104 to interface with system 100 and/or external resources 120, and/or provide other functionality attributed herein to client computing platforms 104. By way of non-limiting example, the given client computing platform 104 may include one or more of a desktop computer, a laptop computer, a handheld computer, a NetBook, a Smartphone, a gaming console, and/or other computing platforms.

The external resources 120 may include sources of information, hosts and/or providers of virtual environments outside of system 100, external entities participating with system 100, and/or other resources. In some implementations, some or all of the functionality attributed herein to external resources 120 may be provided by resources included in system 100.

The game server 102 may include electronic storage 122, one or more processors 124, and/or other components. The game server 102 may include communication lines, or ports to enable the exchange of information with a network and/or other computing platforms. Illustration of game server 102 in FIG. 1 is not intended to be limiting. The game server 102 may include a plurality of hardware, software, and/or firmware components operating together to provide the functionality attributed herein to game server 102. For example, game server 102 may be implemented by a cloud of computing platforms operating together as game server 102.

Electronic storage 122 may comprise electronic storage media that electronically stores information. The electronic storage media of electronic storage 122 may include one or both of system storage that is provided integrally (i.e., substantially non-removable) with game server 102 and/or removable storage that is removably connectable to game server 102 via, for example, a port (e.g., a USB port, a firewire port, etc.) or a drive (e.g., a disk drive, etc.). Electronic storage 122 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 122 may include one or more virtual storage resources (e.g., cloud storage, a virtual private network, and/or other virtual storage resources). Electronic storage 122 may store software algorithms, information determined by processor 124, information received from game server 102, information received from client computing platforms 104, and/or other information that enables game server 102 to function as described herein.

Processor(s) 124 is configured to provide information processing capabilities in game server 102. As such, processor 124 may include one or more of a digital processor, an analog processor, a digital circuit designed to process information, an analog circuit designed to process information, a state machine, and/or other mechanisms for electronically processing information. Although processor 124 is shown in FIG. 1 as a single entity, this is for illustrative purposes only. In some implementations, processor 124 may include a plurality of processing units. These processing units may be physically located within the same device, or processor 124 may represent processing functionality of a plurality of devices operating in coordination. The processor 124 may be configured to execute modules 106, 108, 110, 112, 114, 116, 118, and/or other modules. Processor 124 may be configured to execute modules 106, 108, 110, 112, 114, 116, 118, and/or other modules by software; hardware; firmware; some combination of software, hardware, and/or firmware; and/or other mechanisms for configuring processing capabilities on processor 124.

It should be appreciated that although modules 106, 108, 110, 112, 114, 116, and 118 are illustrated in FIG. 1 as being co-located within a single processing unit, in implementations in which processor 124 includes multiple processing units, one or more of modules 106, 108, 110, 112, 114, 116, and/or 118 may be located remotely from the other modules. The description of the functionality provided by the different modules 106, 108, 110, 112, 114, 116, and/or 118 described below is for illustrative purposes, and is not intended to be limiting, as any of modules 106, 108, 110, 112, 114, 116, and/or 118 may provide more or less functionality than is described. For example, one or more of modules 106, 108, 110, 112, 114, 116, and/or 118 may be eliminated, and some or all of its functionality may be provided by other ones of modules 106, 108, 110, 112, 114, 116, and/or 118. As another example, processor 124 may be configured to execute one or more additional modules that may perform some or all of the functionality attributed below to one of modules 106, 108, 110, 112, 114, 116, and/or 118.

Figure 2:
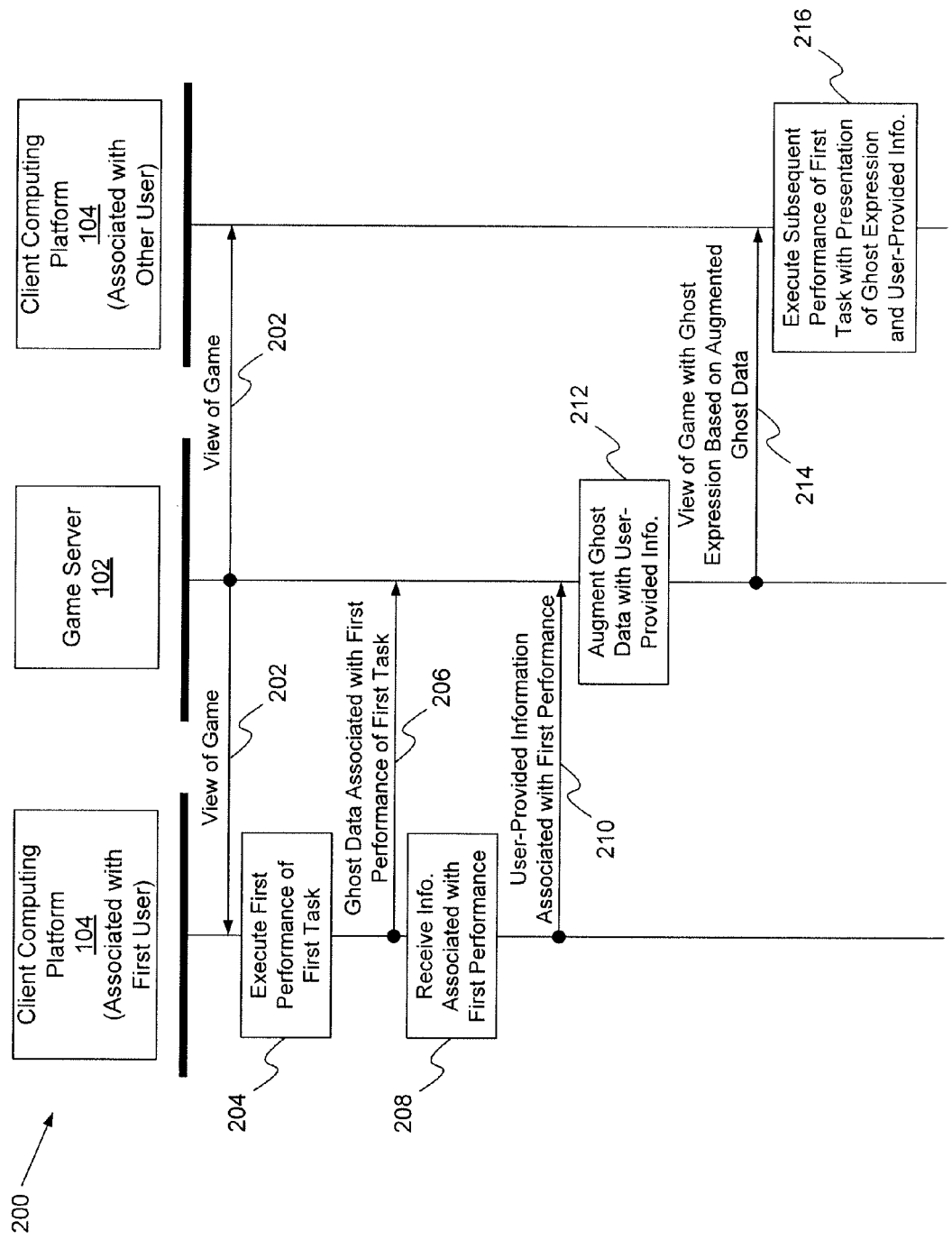
FIG. 2 illustrates a method for providing ghost expressions with user-provided information in asynchronous gameplay, in accordance with one or more implementations.

FIG. 2 illustrates a method 200 for providing ghost expressions with user-provided information in asynchronous gameplay, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At operation 202, a view of a game may be communicated from game server 102 to one or more client computing platforms 104. In some implementations, the game module 108 may perform operation 202.

At operation 204, a first performance of a first task within the game may be executed via a client computing platform 104 associated with the first user.

At operation 206, ghost data associated with the first performance of the first task in a game may be obtained. In some embodiments, operation 206 may be performed by the ghost expression module 112.

At operation 208, information associated with the first performance of the first task may be received from the first user via the client computing platform 104 associated with the first user.

At operation 210, the user-provided information associated with the first performance of the first task in the game may be obtained. The user-provided information module 114 may perform operation 210, in accordance with some implementations.

At operation 212, the ghost data is augmented with the user-provided information to obtain augmented ghost data. In some implementations, the augmentation module 116 may perform operation 212.

At operation 214, a view of the game with a ghost expression based on the augmented ghost data is communicated to a client computing platform associated with another user. The game module 108 may perform operation 214, according to some implementations.

At operation 216, the other user may execute a subsequent performance of the first task within the game via the client computing platform 104 associated with the other user. During the subsequent performance, a ghost expression corresponding to the first performance of the first task and at least a portion of the user-provided information may be presented to the other user.

Although the present invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any implementation can be combined with one or more features of any other implementation.

What is claimed is:

1. A computer-implemented method for providing user-provided information in asynchronous gameplay, the method being implemented in a computer system comprising one or more physical processors and storage media storing machine-readable instructions, the method comprising:

during a first performance by a first user of a first task in a game, the game being presented to the first user via a first user interface:

obtaining ghost data associated with the first performance by the first user of the first task in the game, the ghost data being configured to allow generation of a ghost expression in the game corresponding to the first performance of the first task in the game by the first user, wherein the ghost expression includes a visualization of the first performance by the first user of the first task in the game;

subsequent to the first performance by the first user of the first task in the game:

obtaining user-provided information from the first user associated with the first performance of the first task in the game, a portion of the user-provided information corresponding to a temporal point within the first task; and generating augmented ghost data, the augmented ghost data being generated at least by augmenting the ghost data at the temporal point within the first task with the portion of the user-provided information corresponding to the temporal point within the first task; and during a second performance by a second user of the first task in the game, the second user being different from the first user, the game being presented to the second user via a second user interface:

providing the augmented ghost data to effectuate presentation of the augmented ghost data in the game, the presented augmented ghost data including both the ghost expression from the first performance and at least the portion of the user-provided information corresponding to the temporal point within the first task such that the portion of the user-provided information corresponding to the temporal point is provided to the second user via the second user interface during the second performance of the first task at the temporal point during the presentation of the ghost expression.

2. The method of claim 1, wherein the first task includes a race, a mission, a fight, an episode, a competition, a session, a quest, or a level within the game.

3. The method of claim 1, wherein the user-provided information includes one or more of metadata, text, an image, audio, video, olfactory feedback, or haptic feedback.

4. The method of claim 1, wherein another portion of the user-provided information is provided by one or both of the first user or one or more other users of the game.

5. The method of claim 1, wherein another portion of the user-provided information corresponds to one or both of a progress point of the first task or a spatial point within the game.

6. The method of claim 1, wherein the presentation of the user-provided information is based on one or more rules.

7. The method of claim 6, wherein individual ones of the one or more rules are based on one or more of an individual user identity, a group of users, a parental control metric, demographic data, a user profile, or a status associated with one or more users.

8. A system configured for providing user-provided information in asynchronous gameplay, the system comprising:

one or more physical processors configured by machine-readable instructions to:

during a first performance by a first user of a first task in a game, the game being presented to the first user via a first user interface:

obtain ghost data associated with the first performance by the first user of the first task in the game, the ghost data being configured to allow generation of a ghost expression in the game corresponding to the first performance of the first task in the game by the first user, wherein the ghost expression includes a visualization of the first performance by the first user of the first task in the game;

subsequent to the first performance by the first user of the first task in the game:

obtain user-provided information from the first user associated with the first performance of the first task in the game, a portion of the user-provided information corresponding to a temporal point within the first task; and generate augmented ghost data, the augmented ghost data being generated at least by augmenting the ghost data at the temporal point within the first task with the portion of the user-provided information corresponding to the temporal point within the first task; and during a second performance by a second user of the first task in the game, the second user being different from the first user, the game being presented to the second user via a second user interface:

provide the augmented ghost data to effectuate presentation of the augmented ghost data in the game, the presented augmented ghost data including both the ghost expression from the first performance and at least the portion of the user-provided information corresponding to the temporal point within the first task such that the portion of the user-provided information corresponding to the temporal point is provided to the second user via the second user interface during the second performance of the first task at the temporal point during the presentation of the ghost expression.

9. The system of claim 8, wherein the first task includes a race, a mission, a fight, an episode, a competition, a session, a quest, or a level within the game.

10. The system of claim 8, wherein the user-provided information includes one or more of metadata, text, an image, audio, video olfactory feedback, or haptic feedback.

11. The system of claim 8, wherein another portion of the user-provided information is provided by one or both of the first user or one or more other users of the game.

12. The system of claim 8, wherein another portion of the user-provided information corresponds to one or both of a progress point of the first task or a spatial point within the game.

13. The system of claim 8, wherein the one or more physical processors are further configured by machine-readable instructions to determine the presentation of the user-provided information based on one or more rules.

14. The system of claim 13, wherein individual ones of the one or more rules are based on one or more of an individual user identity, a group of users, a parental control metric, demographic data, a user profile, or a status associated with one or more users.

15. A non-transitory computer-readable storage medium having machine-readable instructions embodied thereon, the machine-readable instructions being executable by one or more physical processors to perform a method for providing user provided information in asynchronous gameplay, the method comprising:

during a first performance by a first user of a first task in a game, the game being presented to the first user via a first user interface:

obtaining ghost data associated with the first performance by the first user of the first task in the game, the ghost data being configured to allow generation of a ghost expression in the game corresponding to the first performance of the first task in the game by the first user, wherein the ghost expression includes a visualization of the first performance by the first user of the first task in the game;

subsequent to the first performance by the first user of the first task in the game:

obtaining user-provided information from the first user associated with the first performance of the first task in the game, a portion of the user-provided information corresponding to a temporal point within the first task; and obtaining augmented ghost data, the augmented ghost data being generated at least by augmenting the ghost data at the temporal point within the first task with the portion of the user-provided information corresponding to the temporal point within the first task; and during a second performance by a second user of the first task in the game, the second user being different from the first user, the game being presented to the second user via a second user interface:

providing the augmented ghost data to effectuate presentation of the augmented ghost data in the game, the presented augmented ghost data including both the ghost expression from the first performance and at least the portion of the user-provided information corresponding to the temporal point within the first task such that the portion of the user-provided information corresponding to the temporal point is provided to the second user via the second user interface during the second performance of the first task at the temporal point during the presentation of the ghost expression.

16. The computer-readable storage medium of claim 15, wherein:

the first task includes a race, a mission, a fight, an episode, a competition, a session, a quest, or a level within the game; and the user-provided information includes one or more of metadata, text, an image, audio, video, olfactory feedback, or haptic feedback.

* * * * *